Jan. 6, 1959 W. W. HENNING ET AL 2,867,444
LOW-BED VEHICLE WITH SWING-UNDER RETRACTABLE WHEELS
Filed March 8, 1956 6 Sheets-Sheet 1

INVENTORS.
William W. Henning
Gottfried J. Storatz
Paul O. Pippel
Atty.

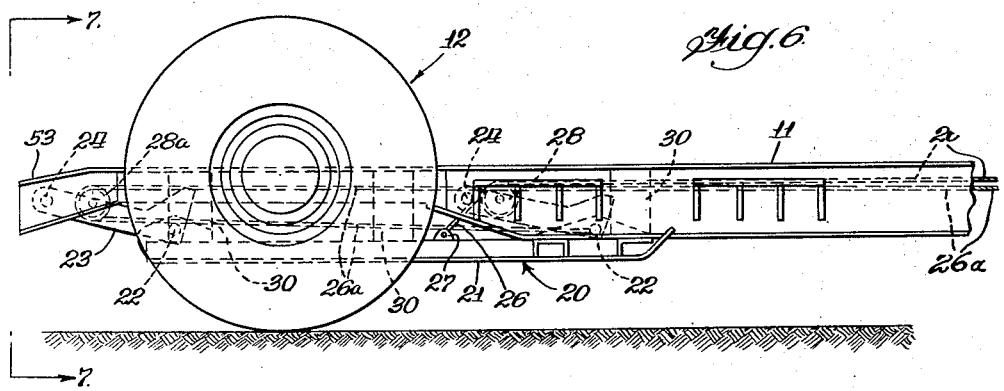
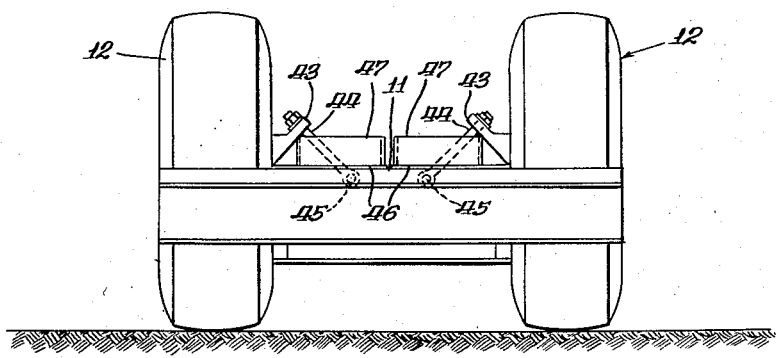
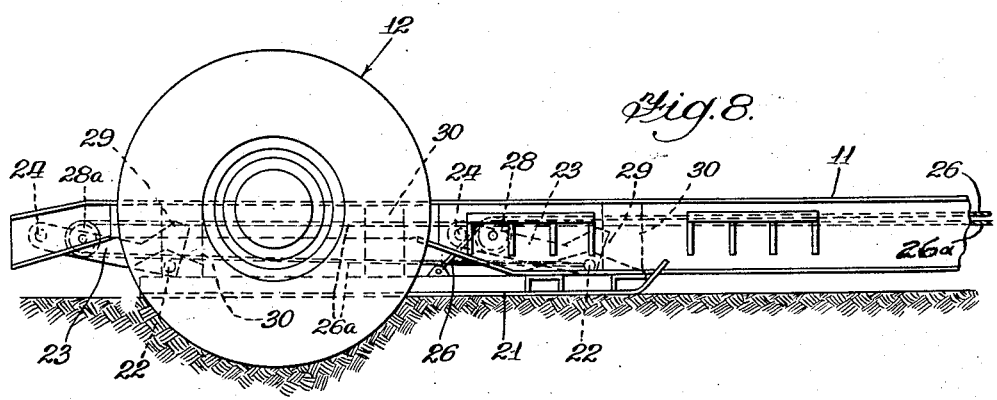

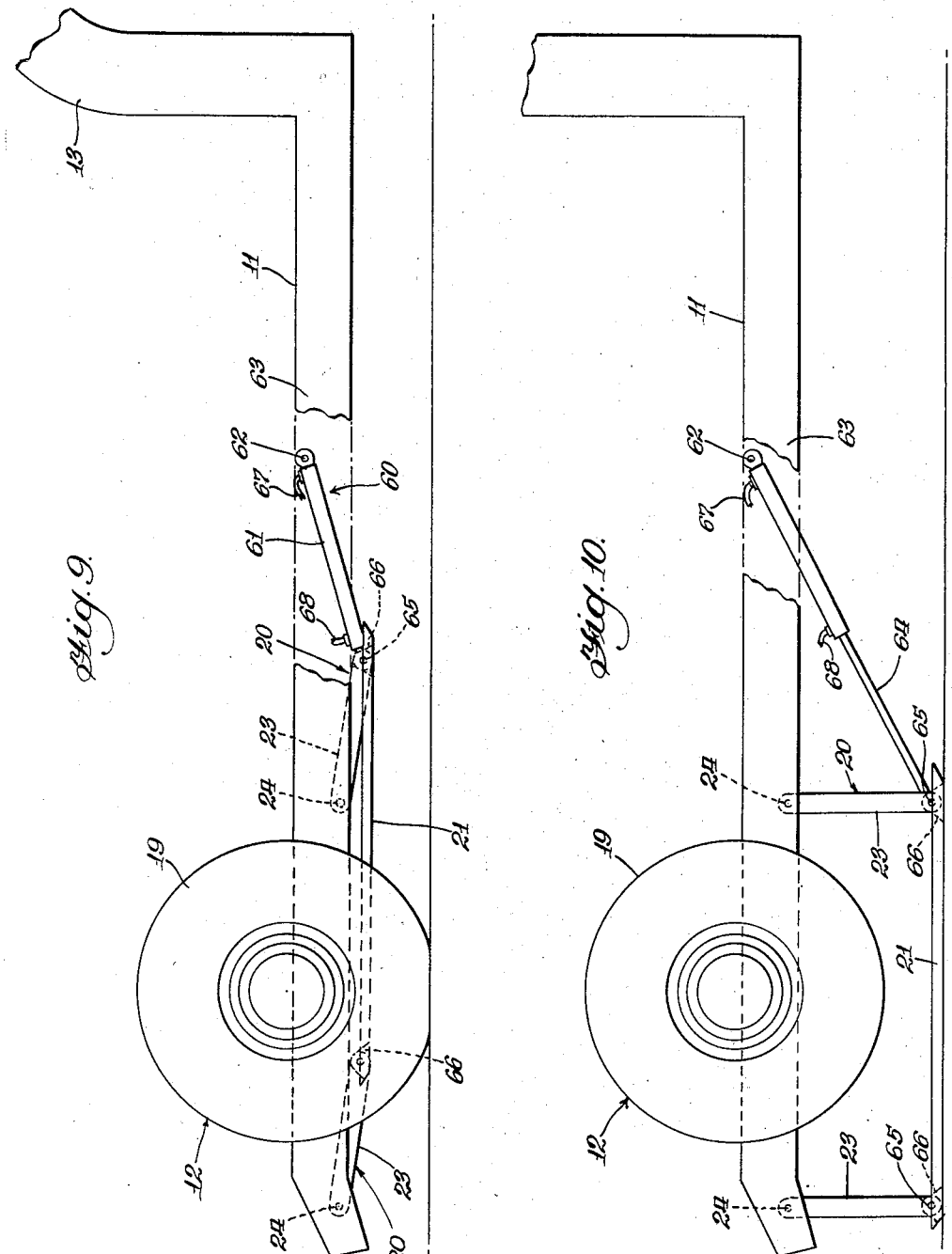

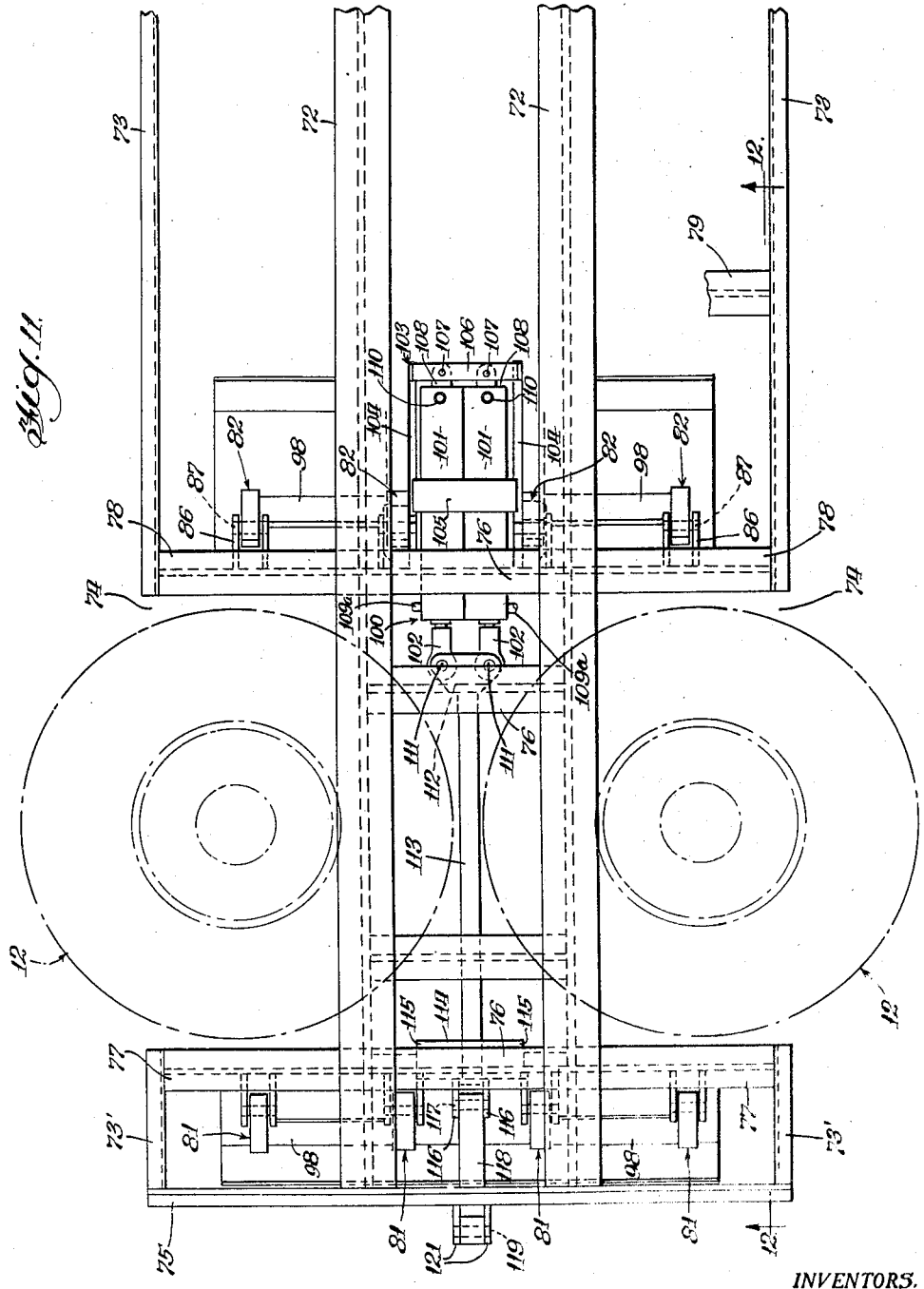

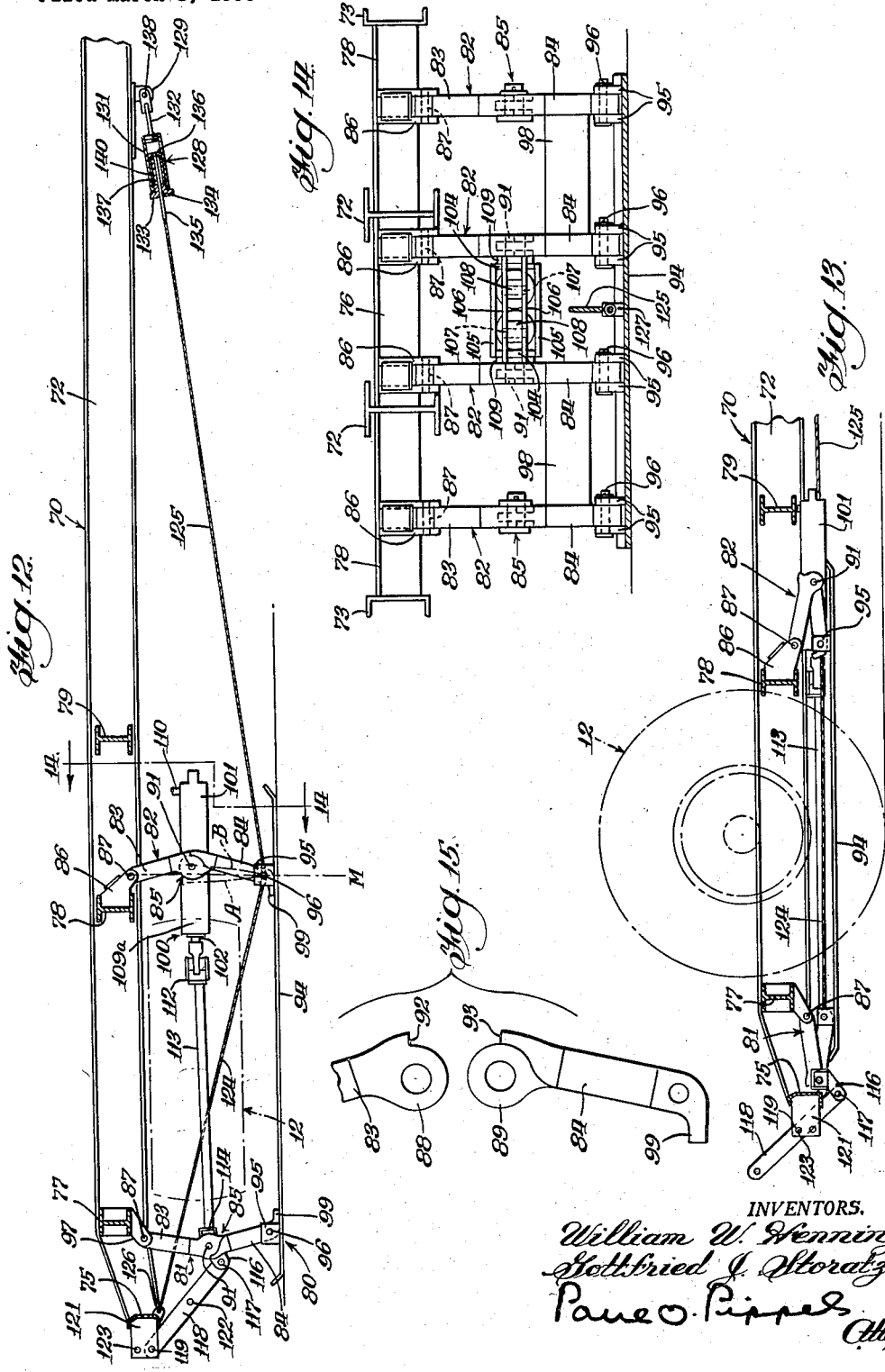

United States Patent Office 2,867,444
Patented Jan. 6, 1959

2,867,444

LOW-BED VEHICLE WITH SWING-UNDER RETRACTABLE WHEELS

William W. Henning, Prospect Heights, and Gottfried J. Storatz, Park Ridge, Ill., assignors to International Harvester Company, a corporation of New Jersey Application March 8, 1956, Serial No. 570,278

9 Claims. (Cl. 280—9)

This invention relates to hauling vehicles of the low-bed type customarily towed behind a tractor and for transporting heavy objects which can be more easily loaded onto the low-bed, the invention more particularly concerning such a vehicle of which relatively large diameter supporting wheels can be tucked under the low-bed frame during the loading process so as to be non-obstructive of objects being loaded onto the frame.

Low-bed vehicles for hauling objects of great mass are conventionally constructed with a large number of small diameter wheels disposed completely beneath the bed frame of the vehicle. A large number of wheels has been necessary to provide adequate ground support for the loaded vehicle, and, to avoid the vehicle having an excessive over-all width these wheels have been placed beneath the bed frame. Since the bed frame is to be supported at low elevation the wheels thereunder have necessarily been of small diameter. No part of the wheel could project up through the bed frame because of the obstruction that would be formed thereby to the movement of a heavy object usually up a ramp across the rear edge of the bed frame and then forwardly along the frame into the desired position thereon. Frequently the objects are fully as wide as the bed frame in which instances it is impossible to shift the object forwardly from the rear edge of the bed frame without further elevating it over the upper portions of the wheels if these wheels project above the upper surface of the frame.

In addition to the difficulty of servicing the great number of supporting wheels beneath the bed frame of such a vehicle there is a further disadvantage that the small diameter wheels drop farther into chuck holes and other depressions in the road surface. Consequently the vehicle is susceptible of miring down or getting stuck under adverse road conditions. Moreover, because of the tendency of the small wheels to dip into small pits in the course being traversed, it is imperative that the vehicle be transported at slow speed.

An important object of the present invention is the provision of a low-bed vehicle utilizing a pair of wheels respectively at opposite sides of the bed frame of the low-bed vehicle, and in such a manner that these wheels can be of large diameter and of sufficient width axially of the hubs to provide ground contacting area of "floatation" equal to that of a plurality of small diameter wheels disposed beneath the bed frame. The large diameter wheels enable this loaded vehicle to be moved along the highway or over other courses at much greater speed than if the wheels were of small diameter.

A further object is the provision of a low-bed hauling vehicle having large diameter wheels at opposite sides thereof that are the diameter to project both above and below the bed frame while the wheels are in operating position, but which are swingable from this operating position wherein their axes are in a horizontal plane to a position under the bed frame wherein the wheels are in a horizontal plane but their axes are substantially in vertical planes. The wheels are swung into this non-operating position to move the upper portions thereof from the space through which heavy objects must be moved while being loaded and shifted on the upper surface of the bed frame.

A further object is the provision of an auxiliary bed frame supporting structure projectable downwardly from a retracted upward position beneath the bed frame into engagement with the ground for jacking the bed frame and the wheels upwardly and for supporting them while the wheels are swung downwardly and under the bed frame to facilitate loading of the vehicle.

A further object is the provision of an auxiliary bed frame supporting structure having a pad as the ground-engaging portion thereof and which can also be used for sliding against the ground surface for supplementing the floatation of the wheels under adverse conditions where the wheels tend to mire down into the ground.

A further object is the provision of a low-bed vehicle wherein the wheels, capable of being swung under the bed frame during loading, are accommodated by wheel-receiving notches in the sides of the bed frame while the wheels are in operating position, and wherein there are cover plates swingable into position for covering these openings and providing support for objects being loaded onto the bed frame while the wheels are retracted under the frame.

The above and other desirable objects inherent in and encompassed by the invention are elucidated in the ensuing specification, the appended claims and the annexed drawings, wherein:

Fig. 6 is a view taken similar to Fig. 4 but with the auxiliary bed frame supporting structure shown retracted and with the supporting wheels for the frame shown in operating position.

Fig. 7 is a rear elevational view taken at the plane indicated by the line 7—7 in Fig. 6.

Fig. 8 is a fragmentary side elevational view illustrating the vehicle with the supporting wheels mired down into soft earth to such as extent that the skid-like pad of the auxiliary bed frame supporting structure rests upon the ground surface to supplement floatation of the wheels and diminish the amount of miring.

Fig. 9 is a fragmentary side elevational view taken similarly to Fig. 6 of a low-bed vehicle like that illustrated in the lower numbered figures with the exception that a hydraulic ram is connected between the bed frame and the auxiliary supporting structure therefor.

Fig. 10 is like Fig. 9 but showing the hydraulic ram expanded for projecting the auxiliary frame supporting structure downwardly against the ground surface for jacking the frame and the wheels upwardly.

Fig. 11 is a fragmentary plan view of the bed frame of a low bed vehicle together with another species of retractable supporting structure embodying a ground engaging skid pad.

Fig. 12 is a sectional view taken at the line 12—12 of

Fig. 11 and showing the retractable supporting structure in side elevation.

Fig. 13 is a view taken similarly to Fig. 12 but showing the retractable supporting structure in the retracted position and diagrammatically showing the bed frame supporting wheels in position for supporting the bed frame.

Fig. 14 is a transverse sectional view taken on the line 14—14 of Fig. 12.

Fig. 15 is an exploded view showing upper and lower leg members of one of the jointed legs disclosed in Figs. 12, 13 and 14.

Figure 1:
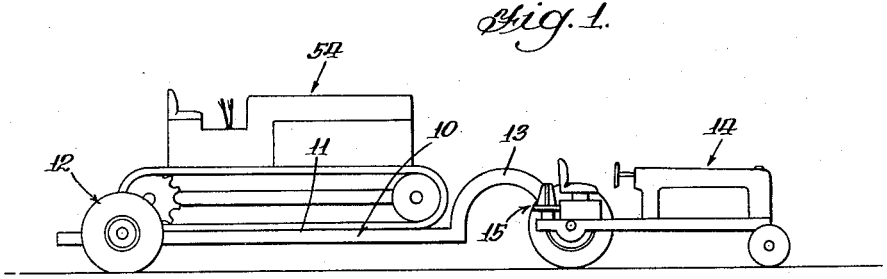
Fig. 1 is a side elevational view of a tractor hitched to a low-bed trailer constructed to embody a preferred form of the present invention.
Figure 2:
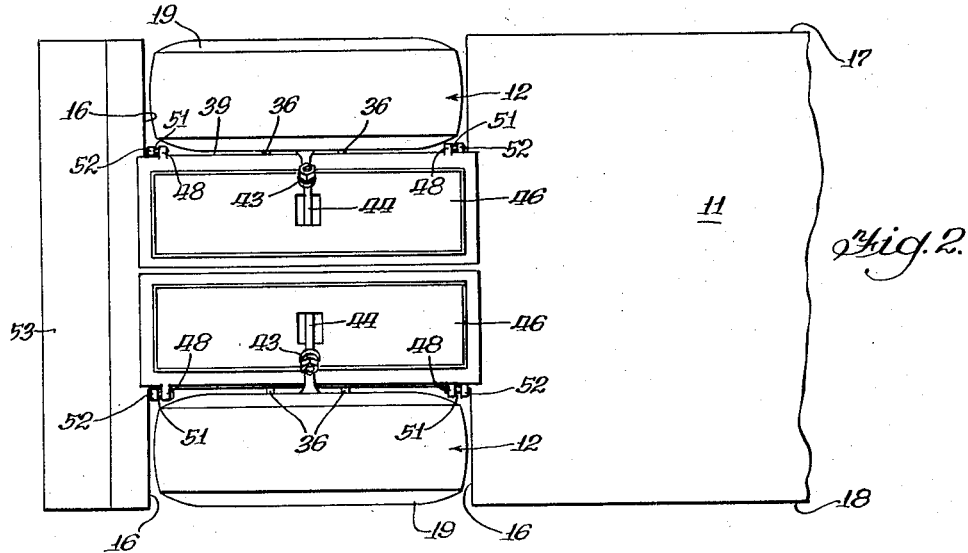
Fig. 2 is an enlarged fragmentary plan view of a rear portion of a low bed trailer vehicle as shown in Fig. 1.

Referring now particularly to Fig. 1, the low-bed trailer vehicle 10 there shown constituting an embodiment of the present invention is of the semi-trailer species having a low-bed frame 11 supported adjacent its rear end upon wheels 12 at opposite lateral sides of such bed frame and supported at its front end by means of a gooseneck 13 conventionally pivotally connected with a rear portion of a tractor 14 by a universal pivot connection 15. In Figs. 2 and 7 it can be seen there are two supporting wheels 12 of the rubber tire type at opposite sides of the bed frame 11. When these wheels are in their operating position in Figs. 1, 2, 6, 7 and 8, they are disposed respectively within large notches 16 respectively within opposite fore and aft extending edges 17 and 18 of the bed frame. The tires 19 of the wheels 12 are of large diameter so as to extend substantially below and above the bed frame and also are of substantial width to provide the desired floatation by having a large area of contact with the ground.

Figure 4:
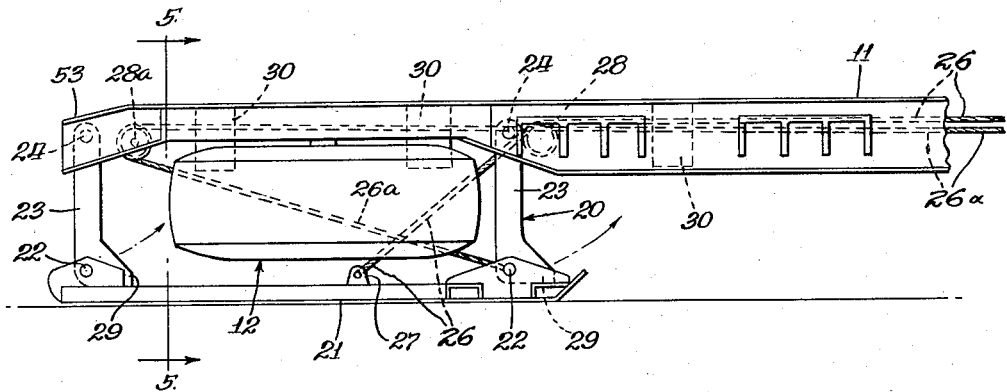
Fig. 4 is an enlarged fragmentary side elevational view taken at the line 4—4 in Fig. 3.
Figure 5:
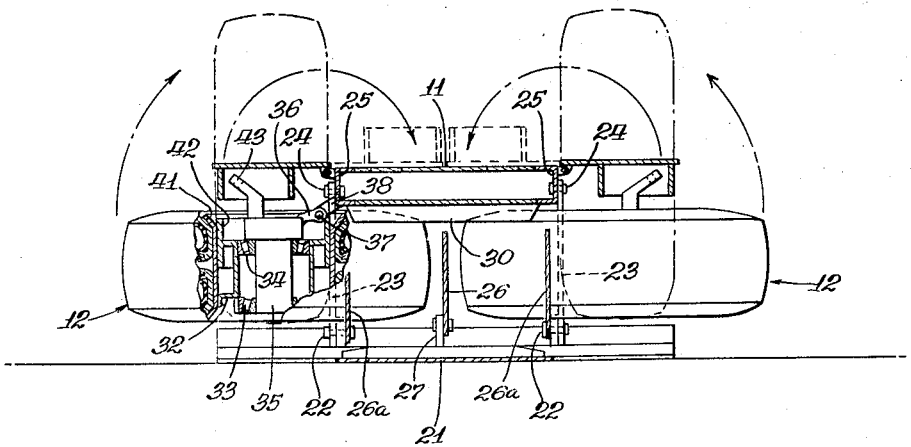
Fig. 5 is a sectional view taken at the plane indicated at the line 5—5 in Fig. 4.

An auxiliary supporting means for the bed frame 11 is provided by a retractable supporting structure 20 shown retracted in Figs. 6, 7 and 8. This auxiliary supporting structure is for jacking up the bed frame and supporting wheels 12 as illustrated in Figs. 4 and 5 to enable the supporting wheels to be pivotally swung downwardly and under the bed frame to facilitate loading of heavy objects onto such frame from the back end and moving such objects forwardly through the space that would otherwise be occupied by the upwardly projecting portions of the wheels. A skid-forming pad 21 constituting the lower portion of the auxiliary supporting structure 20 is pivotally connected at 22, Figs. 4, 6 and 8, with the lower ends of leg elements 23 of which upper end portions are pivotally connected by pins 24 with longitudinally extending channel webs 25, Fig. 5, of the bed frame.

Normally the auxiliary supporting structure 20 is maintained retracted by means of a cable 26 indirectly connected with the legs 23 of such structure through a cable anchorage means 27 mounted on the skid pad 21. This cable 26 which passes over a guide roller 28, Figs. 4 and 6, mounted on the under side of the bed frame 11, extends forwardly to and about an operating windlass drum therefor (not shown) upon the tractor 14. The tractor operator when he wishes to lower the auxiliary supporting structure 20 will permit the cable 26 to pay out from said windlass to allow the pivoted legs 23 to swing downwardly and rearwardly about their transverse pivot axes in the pivots 24 to initially place the skid pad 21 into engagement with the ground. Then by driving the tractor slowly forwardly while winding in the forward portion of a cable 26a onto a second drum (not shown) on the tractor, this cable in acting about a guide roller 28a therefor and through one of the forward leg-pivot pins 22 will hold the pad against forward movement with the bed frame 11, whereby this bed frame will be pulled forwardly relatively to the pad and vaulted upwardly onto the legs 23 to jack such bed frame and the wheels 12 upwardly with respect to the ground; see Figs. 4 and 5. Unless there is an excessive load on the bed frame 11 it can be jacked up onto the auxiliary supporting structure 20 without the operation of pulling the bed frame forwardly by the tractor and solely by winding in the cable 26a on the tractor windlass. Forwardly extending lugs 29 on the lower end portions of the legs 23 abut against the upper side of the skid pad 21 to limit clockwise pivoting of the legs 23 about their pivots 24 and thus prevent the bed frame 11 passing the zenith of its position upwardly onto the legs 23.

When it is desired to transfer the weight of the bed frame and any load thereon onto the supporting wheels 12, the wheels 12 will be swung from the tucked-under position of Fig. 5 to the operating position of Fig. 7 whereupon the tractor 14 and trailer 10 are backed up to pivot the legs 23 counterclockwise about their pivots 24 and thus allow the wheels to descend onto the ground. With the weight thus removed from the auxiliary supporting structure 20, the operating cable 26 can then be wound in upon the tractor-mounted winch for again retracting this auxiliary supporting structure into the Fig. 6 position. This Fig. 6 position is obtained incident to the upper side of the skid pad 21 coming into abutment with stops 30 projecting downwardly from the underside of the bed frame 11.

Wheels 12, as can be seen in Fig. 5, respectively comprise a hub 32 mounted by means of an outer tapered roller bearing unit 33 and an inner tapered roller bearing unit 34 upon an axle spindle 35 having a pair of apertured ears 36 upon its flanged inner end. These ears 36 are pivotally connected by pins 37 with ears 38 depending from the bed frame 11 adjacent the receded edges of the wheel-receiving bed frame notches 16; see Fig. 2. The tires 19 of wheels 12 are conventionally mounted upon a rim 41 of their respectively associated wheel hubs 32. Brake drums 42 may be associated with the wheel hubs.

Figure 3:
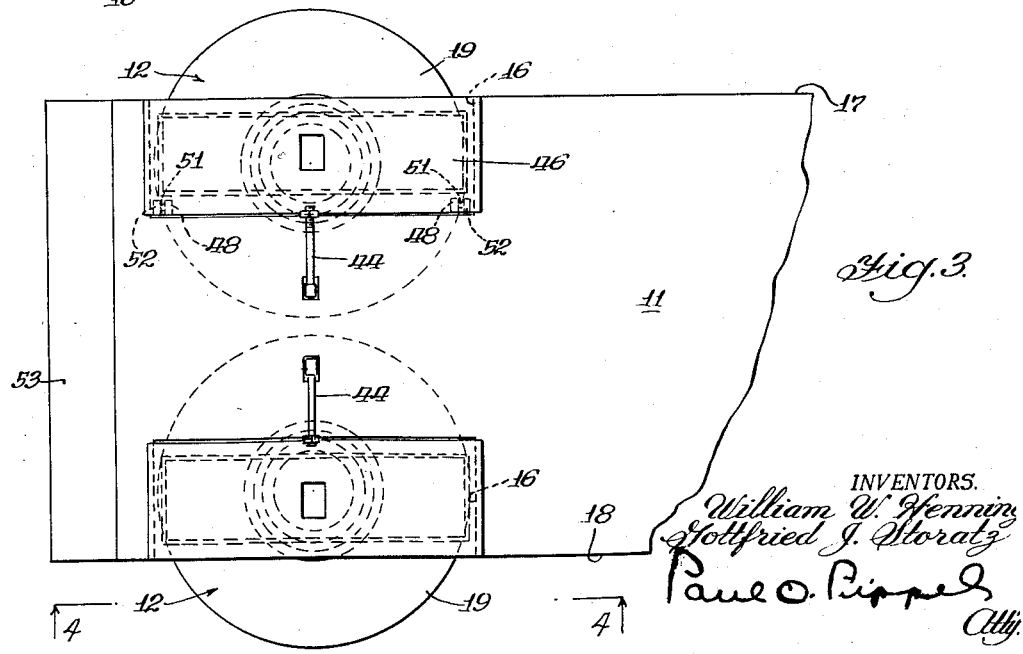
Fig. 3 is a view taken similarly to Fig. 2 of the vehicle but showing the wheels swung downwardly and under the bed frame and also showing covers for wheel-receiving recesses in position over these recesses.

The wheels are in their operating position when the axle spindles 35 are swung upwardly into the horizontal position pursuant to which the wheels 12 will be placed in the upright position illustrated in Figs. 1, 2, 6, 7, 8. While in this position, brackets 43 respectively upon the flanged inner ends of the axle spindles 35 are attached to pivoted bolts 44, Fig. 7 which are pivotally anchored at 45 to the bed frame 11. When the securing bolts 44 are detached from the brackets 43 of the wheel spindles, while the wheels 12 are elevated from the ground by the auxiliary supporting structure 20, since the center of mass of the wheels is disposed outwardly from the pivot pins 37, the wheels pivot by the force of gravity downwardly about the pivot pins 37 and swing beneath respective portions of the bed frame as illustrated in Figs. 3, 4 and 5. The wheels are restrained during this downward swinging movement to limit the speed of such movement.

After the supporting wheels 12 have been swung downwardly and under the bed frame 11 the notches 16 in the side edges of the bed frame may be covered by cover plates 46 which have reinforcing flanges 47 of rectangular configuration projecting from their under sides. Each cover plate 46 has a pair of apertured ears 48 pivotally mounted upon pins 51 in respectively associated ears 52 mounted on the bed frame 11 along the receded edge 39 of a wheel receiving bed frame notch 16. After the cover plates 46 are in covering position as illustrated in Fig. 3, a ramp (not shown) may be laid upon the sloping rear end portion 53 of the bed frame to slope rearwardly downwardly to the ground. The load to be carried by the low-bed vehicle can then be moved up the ramp and across the cover plates 46 into position upon the frame 11 forwardly of the space to be occupied by the supporting wheels 12 when they are later swung upwardly from the Fig. 5 position to the position shown in Figs. 6 and 7. A typical load for the vehicle would be a crawler tractor as that designated 54 in Fig. 1. Before swinging the supporting wheels outwardly and upwardly into the bed frame recesses 16 the cover plates 46 are first swung upwardly and inwardly above their pivot connections 51 from the Fig. 3 position to the Fig. 2 position to rest flatly upon the top of the bed frame between the wheel receiving notches 16.

The auxiliary supporting structure 20 is operable to supplement flotation of the wheels 12 in soft earth or sand where a heavy load tends to mire down the wheels. Under these circumstances the skid pad 21 coming in contact with the ground surface diminishes the distance the wheels 12 would otherwise sink into the ground and also functions as a skid to diminish transport resistance of the trailer. The depth of miring down by the wheels 12 is controllable by forcing the pad 21 downwardly against the ground by reeling in the cables 26a; see Fig. 5. In this manner the pad 21 can be held selectively downwardly from the stops 30 to correspondingly limit the depth to which the wheels can sink into the ground. Fig. 8 illustrates an extreme sinking position for the trailer wheels. In this position the stop members 30 projecting downwardly from the under side of the bed frame 11 react against the upper side of the skid-like pad 21 when the latter is being pushed upwardly upon by the ground surface at the time this pad is being used as a skid.

In the modification shown in Figs. 9 and 10, a hydraulic ram 60 is substituted for the cable 26, of the lower numbered figures, for controlling the retractable auxiliary supporting structure 20.

Ram 60 comprises a cylinder 61 connected at its upper and forward end by a pivot pin 62 with a longitudinal brace member 63 of the bed frame 11. The outer end of the piston rod 64 of this cam is connected by a pivot pin 65 with an apertured ear 66 projecting upwardly from the skid pad 21. Fluid lines 67 and 68 respectively communicate with opposite ends of the cylinder 61 so that when fluid is forced inwardly through the line 67, the piston rod 64 will be forced outwardly to expand the ram 60 to forcibly protract the auxiliary supporting structure 20 from the retracted position of Fig. 9 to the bed frame supporting position of Fig. 10 wherein the skid pad 21 is in contact with the ground. By reversing the direction of flow of the fluid in the fluid lines 67 and 68, that is, by forcing fluid through the line 68 into the cylinder 61 the ram is caused to contract for retracting the supporting structure 20 from Fig. 10 position to Fig. 9 position. By using the hydraulic ram 60 for operating the auxiliary supporting structure 20 this supporting structure can be forcibly selectively placed in its landing or retracted positions without driving the tractor forwardly or rearwardly attendant to raising or lowering the low-bed 11 onto or from legs 23, unless the trailer is too heavily loaded.

Referring now to the embodiment shown in Figs. 11 through 15, there is shown the rear portion of a vehicle bed frame 70 comprising a plurality of longitudinally extending frame members 72 and 73. Short longitudinal members 73' are respectively in alignment with the longitudinal members 73 rearwardly of wheel-receiving notches 74 for the wheels 12 which are shown in dot dash lines. The wheels are in the retracted position in Figs. 11 and 12 and in their bed frame supporting position in Fig. 13. A transverse frame member 75 extends across the rear ends of the frame members 72 and 73' to which this member is secured by welding (not shown). A series of transverse frame members 76 extend between and are welded at their ends to the longitudinal frame members 72, whereas transverse members 77 forming the rear sides of the wheel-receiving notches 74 extend between and are connected with the longitudinal frame members 72 and 73' by welding (not shown), and transverse frame members 78 at the forward sides of the wheel-receiving notches are connected by welding between the longitudinal frame members 72 and 73. Additional transverse frame members are provided where needed and one of these is designated 79 in Fig. 12.

A selectively projectable and retractable supporting structure 80 for the bed frame 70 depends from a rear portion thereof. This supporting structure 80 comprises four knee jointed rear legs 81 and four knee jointed front legs 82. Each of these legs 81 and 82 includes an upper leg member 83 and a lower leg member 84 pivotally connected at a knee joint 85.

Upper members 83 of the front legs 82 have their upper ends pivotally connected with bed-frame brackets 86 by means of pivot pins 87, Fig. 12. These pivot pins 86 are coaxial with an axis extending transversely of the bed frame 70. The lower ends of the upper leg members have apertured furcations 88 which straddle an eye on the upper end of the associated lower leg members 84; see Figs. 14 and 15. Pivot pins 91 are respectively disposed in the assembled furcations 88 and eyes 89. These parts 88, 89 and 91 and the stop shoulders 92 and 93 respectively on the lower ends of the leg members 83 and on the upper ends of the leg members 84 are cooperable when these stop shoulders are abutted as illustrated in Fig. 12 to limit pivotal movement of the leg members 83 and 84 relatively to one another in one direction. Pivotal connection is had between the lower ends of the leg members 84 and a skid pad 94 by pairs of apertured ears 95 and pivot pins 96 passing through the lower ends of the members 84 and the ears 95 respectively associated therewith.

The four legs 81 at the rear end of the supporting structure 80 are constructed identically with the forward legs 82 and, therefore, identical reference characters are used for designating parts of the legs 81 that respectively correspond to designated parts of the legs 82. Upper leg members 83 of the rear legs 81 are pivotally connected with the bed frame through apertured ears 97 upon the transverse frame members 77 and 76, and the lower ends of the leg members 84 are connected pivotally with the skid pad by respectively associated apertured ears 95 and pivot pins 96. The pivot pins 87 of the forward legs 82 are coaxial with a horizontal axis extending transversely of the bed frame as are the pivot pins 91 in the leg joints 85 of these legs and the pivot pins 96 at the lower ends of the leg members 84. Likewise the pivot pins 87 for the rear legs 81 are coaxial with a horizontal axis extending transversely of the bed frame as are the pivot pins 91 in the leg joints 85 of these legs and the pivot pins 96 at the lower ends of the members 84 of these legs. In Fig. 14 it can be seen that the leg members 84 of the two rightmost legs 82 are connected rigidly together by a brace member 98, and that likewise the lower members 84 of the two leftmost legs in Fig. 14 are also connected rigidly together by a brace member 98. In Fig. 11 it can be seen that similar brace members 98 are connected between the lower leg members 84 of the rearmost legs 81. These brace members 98 together with the skid pad 94 brace the lower ends of the jointed legs 81 and 82 against relative horizontal displacement in every direction. Further rigidity of the downwardly projected supporting structure 80 is provided by toes 99 pivoting into abutting relation with the upper face of the skid pad 94 and by the stop elements 92 and 93 at the joints of the legs coming into abutting relation at this time.

Power for operating the retractable supporting structure 80 is transmitted to the knee joints 85 of the legs 81 and 82 by a hydraulic ram device 100. This device comprises a pair of identical ram cylinders 101 of the two-way type having piston rods 102 extending outwardly through their rear ends. The ram cylinders 101 are held rigidly within a frame 103 comprising side members 104, cross members 105 respectively above and below the cylinders 101 and connected between the side members 104, and end members 106 extending between the rear ends of the side members 104 and which are connected with the forward ends of the cylinders 101 by means of pins 107 extending through these members 106 and apertured ears 108 on the forward ends of such cylinders. Heads 109 of the knee joint pins 91 of the legs 82 adjacent opposite sides of the frame 103 are welded to the frame side members 104 so the frame 103 is pivotable coaxially with these knee joint pins 91. Fluid under pressure is selectively introduced into or exhausted from the rear ends of the cylinders 101 through fragmentarily shown conduits 109a and is likewise concurrently exhausted from or introduced into the front ends of the cylinders through the conduits 110. The rear or outer ends of the piston rods 102 are pivotally connected by pins 111 with a head 112 mounted rigidly on the front end of a tubular rod 113. A cross head 114 on the rear end of the rod 113 has the knee joint pins 91 for the adjacent rear legs 81 mounted within the ends 115 of such cross head so that such cross head is pivotable relatively to the leg members 83 and 84 of the rear legs 81 coaxially with the knee joint pins 91 thereof.

The rear side of the cross head 114 has apertured ears 116 projecting rearwardly therefrom for receiving a pivot pin 117 for the pivotal mounting of a brace member 118. When the retractable supporting structure is projected downwardly as shown in Fig. 12 the rear and upward end of this brace member 118 is adapted to be connected by a pin 119 rigidly with apertured ears 121 securely mounted on the transverse frame member 75. While the brace member 118 is in this position it serves as a strut to brace the projected supporting structure 80 against swinging about the pivot pins 87 at the upper ends of the legs 81 and 82. Axial contraction of the rams of the hydraulic ram device 100 pulls the knee joints 85 of the front and rear legs 81 and 82 toward one another from the position shown in Fig. 13 to substantially straighten out the jointed legs and force the skid pad 94 downwardly to an extreme limit position shown in Fig. 12. Subsequent expansion of the ram device causes separation of the leg joints 85 axially of the bed frame 70 to buckle the legs 81 and 82 and retract the supporting structure 80 upwardly beneath the bed frame in the manner illustrated in Fig. 13. While retracted in this manner the pin 119 of the strut 118 will be removed, and when the supporting structure 80 is fully retracted a hole 122 in the member 118 will be disposable in axial registry with the holes 123 in the apertured ears 121 into which the pin 119 is insertable for retaining the supporting structure retracted without the need of hydraulic pressure being maintained in the ram device 100.

Means mounted upon the bed frame 70 and reactable against the supporting structure 80 for causing the skid pad 94 thereof to move substantially vertically during projection and retraction, comprises a pair of cable guide lines 124 and 125. The rear line 124 has its rear end attached to an anchorage 126 approximately midway between the ends of the bed frame cross member 75, whereas the front lower end of such line is anchored to an anchorage 127 projecting upwardly from a front portion of the skid pad 94, see Figs. 12 and 14. A rear end of the front guide line 125 is also anchored to the anchorage 127 on the skid pad whereas the forward end of the line is connected through a slack-take-up device 128 with an apertured ear 129 securely mounted on a more forward center portion of the bed frame 70.

Slack-take-up device 128 comprises a tubular casing 131 having a stem 132 projecting forwardly into connection with the apertured ear 129. A plug 133 forming the rear end of the casing 131 contains a hole 134 for receiving a rod 135 to which the rear end of the line 125 is attached. A spring cup head 136 is slidable axially within the cylindrical casing 131 and is threaded onto the forward end of the rod 135. When the line 125 is under sufficient tension the rod 135 and the spring cup 136 will be pulled rearwardly until the rear end of the spring cup tubular flange 137 abuts against the plug 133. This condition will prevail when the supporting structure 80 is projected downwardly as illustrated in Fig. 12 so both of the lines 124 and 125 will be taut for bracing the projected structure.

Attendant to retraction of the supporting structure 80 the line 125 will prevent the anchorage 127 for the lines 124 and 125 from moving rearwardly of an arc A struck about an axis coaxial with an anchorage pin 138 for the forward end of the line 125, whereas the line 124 will prevent drift of the anchorage 127 forwardly of an arcuate line B generated about the rear line anchorage 126 as an axis. Therefore, at no point of elevation of the skid pad 94 can it drift fore or aft from a reference median line M a distance exceeding the horizontal distance between this median line and the arcuate lines A and B.

Attendant to the supporting structure 80 being retracted upwardly a spring 140 in the slack-take-up device 128 will expand to maintain a nominal tautness in the line 125 and thus prevent it drooping into proximity with the ground beneath the vehicle.

Having described a limited number of species of the invention with the view of clearly and concisely illustrating the same, we claim:

1. In a low-bed hauling vehicle, a bed frame having a rear edge and opposite longitudinal side edges extending forwardly from opposite ends of the rear edge, the side edges containing wheel-receiving notches of which each has a receded edge extending fore and aft of the frame; wheel-supporting spindles pivotally mounted upon the bed frame respectively adjacent the receded edges for swinging movement about fore and aft extending axes to selectively dispose said spindles to project oppositely substantially in a horizontal plane and in vertical registry respectively with said notches or dispose said spindles to project downwardly; bed frame supporting wheels respectively journalled upon said spindles and operable when their axes are in a horizontal plane to support the bed frame and of sufficient diameter to project both above and below the bed frame, an auxiliary supporting structure including a skid having a ground engaging surface and being operable to project the skid downwardly from the frame to press such surface into engagement with the ground for jacking the frame and wheels upwardly with respect to the ground, the wheel-supporting spindles being operable when swung downwardly to swing the jacked-up wheels downwardly through the bed frame notches and under the frame to provide clearance thereabove for transporting a load across and onto the upper side of the frame while the latter is supported upon the auxiliary supporting structure, the skids having an upwardly inclined leading edge onto which such surface extends and such surface being of extended area to substantially supplement flotation of the wheels when projected against ground of a character that such wheels inordinately mire thereinto while their axes are in the horizontal for the wheels to transportively support the bed frame, and means operable of the auxiliary supporting structure to maintain the skid projected an amount to dispose the ground engaging surface selectively above the lower sides of the mired wheels.

2. The combination set forth in claim 1 wherein the auxiliary frame bed supporting structure comprises front and back leg elements pivotally connected to the bed frame at upper end portions thereof about axes extending transversely of the frame and projecting forwardly from such axes, wherein the ground engageable skid extends between and is pivotally connected with the opposite ends of said leg elements, the leg elements being swingable downwardly and rearwardly to place the skid into engagement with the ground surface prior to the legs reaching a vertical position wherefore continued swinging of the legs about their pivotal connections with the bed frame will cause them to react through the skid upon the ground for lifting such frame and the wheels.

3. The combination set forth in claim 2 wherein there is means limiting pivoting of the leg elements to prevent their backward swinging beyond substantially an upright position to prevent the bed frame substantially passing the zenith of its arcuate movement upon the leg elements and descending into contact with the ground.

4. The combination set forth in claim 3 wherein the means limiting backward swinging of the leg elements facilitates the forward swinging of these leg elements from their upright position wherefore the frame can be backed rearwardly to vault downwardly from the leg elements for shifting the weight of the frame from the auxiliary supporting structure onto the wheels while the axes of such wheels are in the horizontal plane, and means for exerting a forward force upon the auxiliary supporting structure to swing the depending legs and pad forwardly and upwardly for holding the pad out of engagement with the ground.

5. In a low bed hauling vehicle, a bed frame having a rear edge and side edges extending forwardly from opposite ends of the rear edge, the side edges containing wheel-receiving notches of which each has a receded edge extending fore and aft of the frame; wheel spindles pivotally mounted upon the bed frame respectively adjacent the receded edges for swinging movement about fore and aft extending axes to selectively dispose said spindles to project oppositely in a substantially horizontal plane in vertical registry respectively with said notches or dispose the spindles to project downwardly; wheels journalled upon said spindles and of a diameter to project both above and below the bed frame while the spindles are horizontal and the wheels are vertical; a sub frame including a skid with a ground-engaging skid surface, the sub frame being mounted beneath said bed frame and movable from an upward retracted position above the ground into lowered ground-engaging positions of which the lowermost disposes the skid surface below the lowermost portions of the vertical wheels to elevate the bed frame and lift the wheels from the ground, the spindles being operable when swung downwardly to swing the tilted wheels therewith downwardly through the bed frame notches, the skid surface being of extended area to substantially supplement floatation of the wheels when projected against the ground while the wheels in transportive support of the bed frame are mired into the ground, and means for projecting the skid and maintaining the skid surface thereof in pressure contact with the ground at selective elevation above the lower sides of the mired wheels to attain such supplement floatation.

6. The combination set forth in claim 5 wherein there are covers respectively for the wheel-receiving notches, means pivotally connecting the covers to the bed frame adjacent to the receded edges of the notches, and the covers being swingable from a position covering the notches while the wheels are swung downwardly and under the frame to a notch-uncovering position wherein the covers are disposed above the frame and between the notches.

7. In a vehicle, a bed frame having front and rear ends, the frame having wheel-receiving spaces therein adjacent the rear end, frame supporting wheels adjacent the rear end of such frame, means mounting the wheels on the frame in a manner that the wheels project upwardly in respective vertical planes through the wheel-receiving spaces while supporting the frame and adapted to carry the wheels downward through such spaces into a non-operating position in a horizontal plane beneath the frame when the latter is otherwise supported, and a retractable supporting structure for said frame, said structure comprising a skid pad having an under side skid surface extending horizontally beneath the frame, and jointed leg means connecting the frame with the pad, said leg means including a rear jointed leg having an upper leg member with an upper end portion pivotally connected with the frame about a horizontal axis extending transversely of the frame, a lower leg member having a lower end portion pivotally connected with the pad about a horizontal axis transverse to the body frame, and a joint structure pivotally connecting the lower end portion of the upper leg member with the upper end portion of the lower leg member about a horizontal axis transverse to the frame, the leg means also comprising a front jointed leg wherein there is an upper leg member pivotally connected at an upper end portion with the bed frame about a horizontal transverse axis spaced forwardly of the frame from the upper end portion of the rear upper leg member, a lower leg member pivotally connected at a lower end portion with the pad about a horizontal axis transverse to the frame, and a joint structure pivotally interconnecting the lower end portion of the upper leg member with the upper end portion of the lower leg member about a horizontal axis transverse to the frame, means for forcibly changing the spacing between the joint structures fore and aft of the body frame to selectively project the skid pad against the ground to impose weight of the bed frame thereon and alternatively to elevate the skid pad upwardly from the ground into a retracted position closely beneath the bed frame, guide means mounted on the bed frame and disposed in guiding relation with the skid pad for guiding the same substantially vertically attendant to retraction and projection thereof, the pad skid surface being of extended area which when pressed against the ground substantially supplements floatation of the wheels when the ground is of a character that the wheels tend to mire thereinto, and the means for changing the spacing between the joint structures being operable to maintain a selected elevation of the skid surface with reference to the lower sides of the mired wheels to obtain such supplemental floatation.

8. The combination set forth in claim 7, wherein said guide means comprises a rear guide line having a forward end portion connected with the skid pad and a rear end portion connected wtih the bed frame, and a forward guide line having a rear end portion connected with the skid pad and a forward end portion connected with the bed frame, and the length of the cables being such that they are taut when the skid pad is fully projected downwardly from the bed frame.

9. The combination set forth in claim 8, wherein at least one of said lines comprises a line slack take-up unit from which such line is substantially fully payed out attendant to the skid pad being fully projected, and which unit is adapted to "pull-in" such line to prevent significant drooping thereof attendant to retraction of the skid pad.

References Cited in the file of this patent

UNITED STATES PATENTS

| | | |
|---|---|---|
| 862,414 | Roberts | Aug. 6, 1907 |
| 1,699,430 | Heinzel | Jan. 15, 1929 |
| 1,842,604 | Guest | Jan. 26, 1932 |
| 2,387,504 | Farr | Oct. 23, 1945 |
| 2,411,183 | Baldwin | Nov. 19, 1946 |
| 2,456,932 | Dostal | Dec. 21, 1948 |
| 2,469,506 | Kerr et al. | May 10, 1949 |
| 2,513,855 | Fogwell | July 4, 1950 |
| 2,621,021 | Dahl et al. | Dec. 9, 1952 |
| 2,751,234 | Couse | June 19, 1956 |
| 2,757,936 | McCavey et al. | Aug. 7, 1956 |
| 2,760,782 | Hartzell | Aug. 28, 1956 |